June 3, 1952 G. T. SHOOSMITH 2,599,491
CONVERTIBLE BULLDOZER OR SHOVEL
Filed Sept. 20, 1948 4 Sheets-Sheet 1
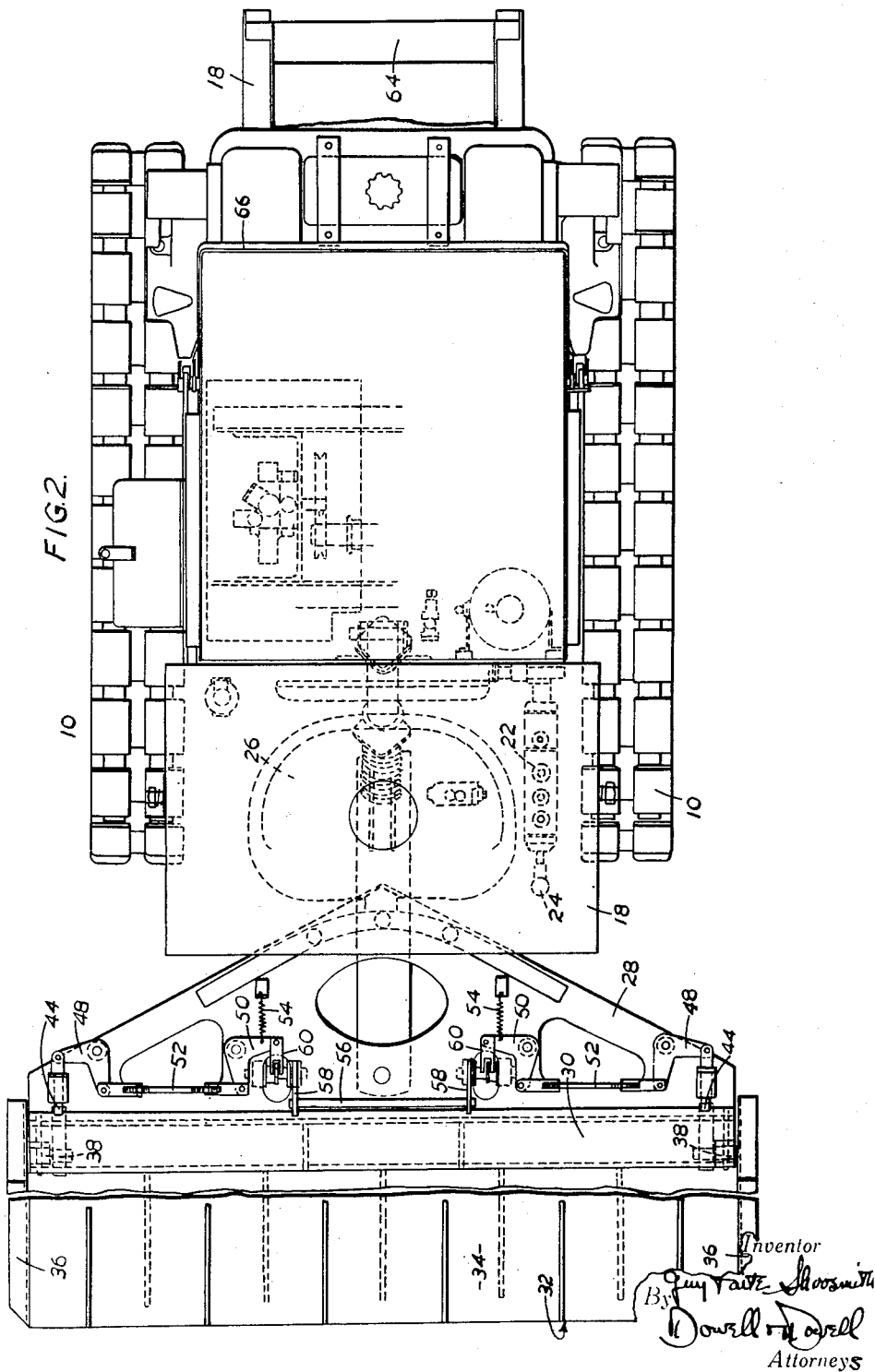

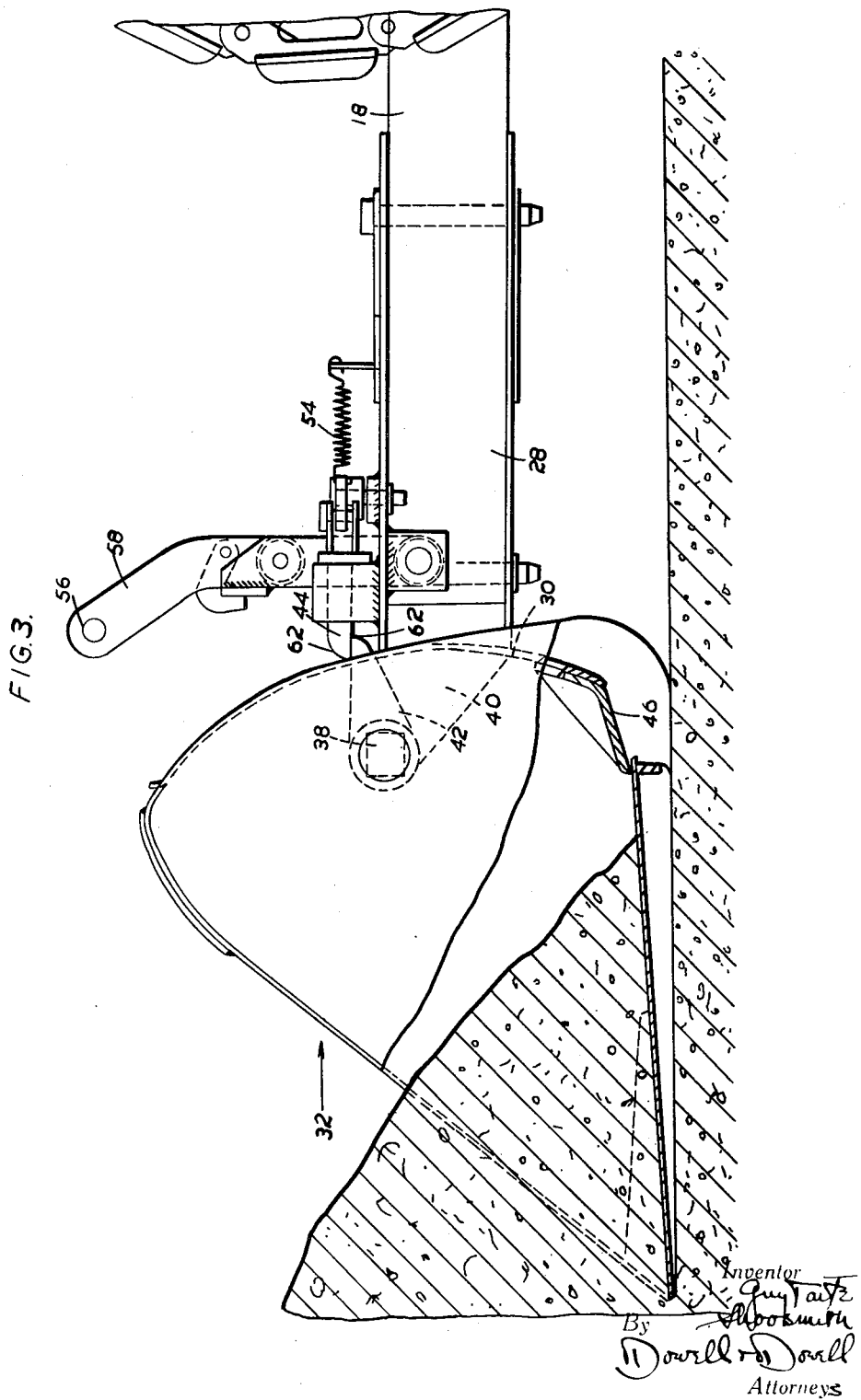

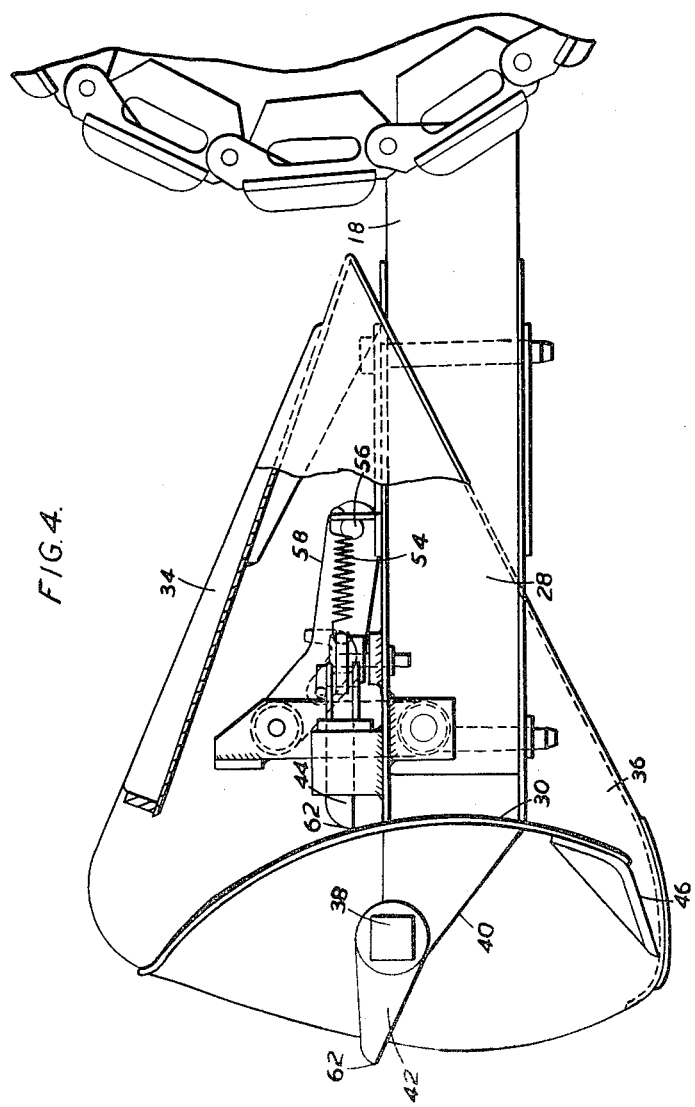

June 3, 1952
G. T. SHOOSMITH
2,599,491
CONVERTIBLE BULLDOZER OR SHOVEL
Filed Sept. 20, 1948
4 Sheets-Sheet 4
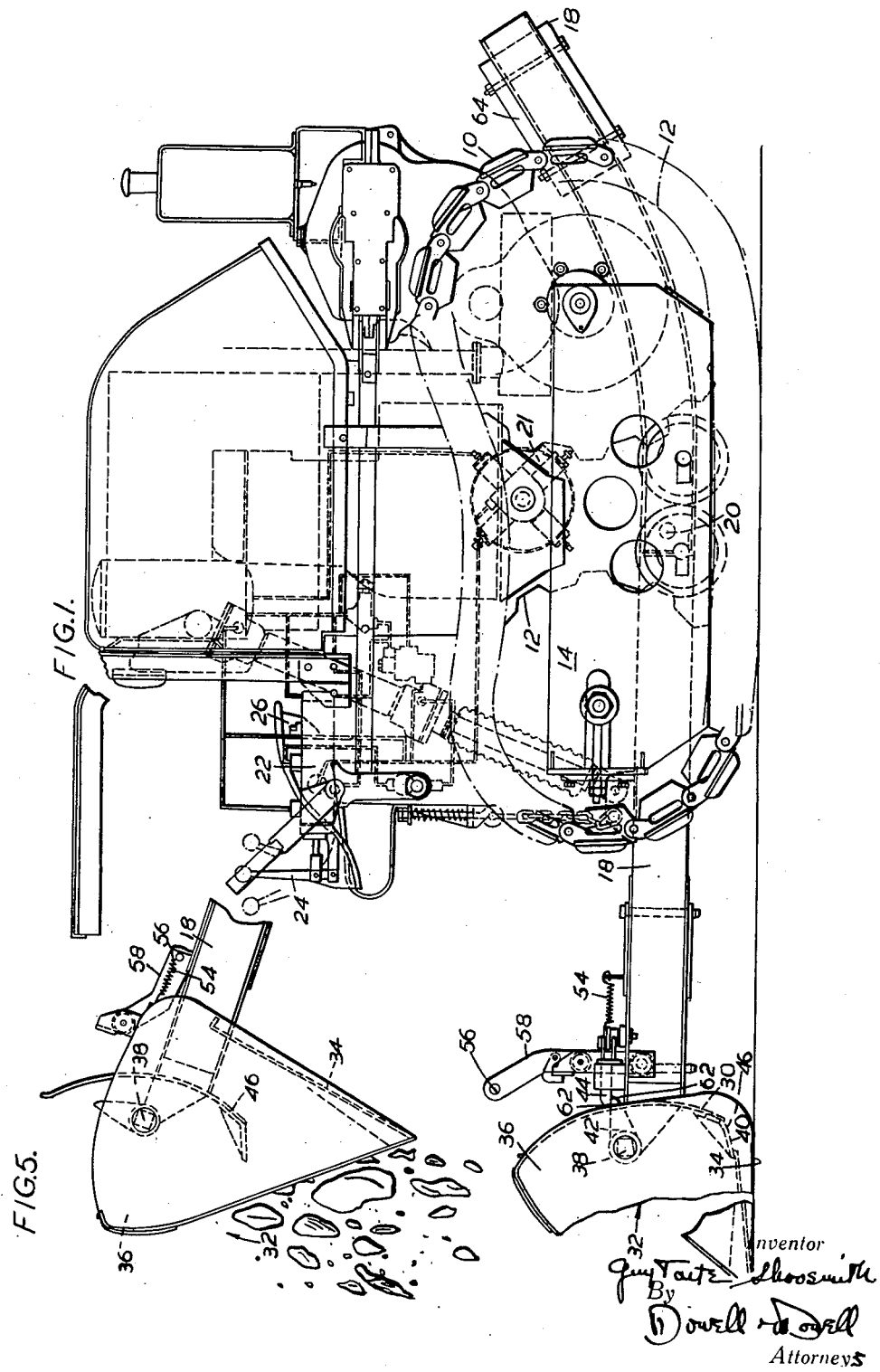

Patented June 3, 1952

2,599,491

UNITED STATES PATENT OFFICE 2,599,491

CONVERTIBLE BULLDOZER OR SHOVEL

Guy Taite Shoosmith, Chislehurst, England

Application September 20, 1948, Serial No. 50,139
In Great Britain September 3, 1947

13 Claims. (Cl. 37—117.5)

This invention relates to bulldozers.

There are many occasions where a bulldozer is used that material has to be picked up and deposited elsewhere—a job for which the bulldozer is not designed.

The invention is concerned with the modification of the bulldozer to enable it to be used, when desired, also as a shovel.

Bulldozers are available today which can be converted for use as power shovels by dismantling the blade and replacing it by a shovel. The conversion is an operation which takes up a lot of time and is one which is not intended to be effected at frequent intervals.

A suggestion has also been made to provide a tractor with a composite blade pivotally mounted on the front end of a boom so that it could be brought into a more or less vertical position and into a more or less horizontal position, the blade acting as a scraper in the one position and as a scoop in the other. A machine of this type suffers from the disadvantage that it is efficient in neither of its two roles.

The machine in accordance with the invention can be used as a bulldozer or as a shovel without any dismantling or replacement of parts and is equally efficient in each of its two roles.

The invention consists of a bulldozer having a boom which carries the usual blade and also carries an attachment which can be swung down in front of the blade to serve as a shovel and up into an inoperative position in which it lies on top of the boom and allows the blade to be used in the ordinary way.

The shovel attachment can be a complete shovel in itself, that is to say, have a base plate, a back plate and a pair of side plates but, preferably, it has only a base plate and a pair of side plates, the bulldozing blade forming the back plate when the machine is in use as a shovel.

It is usual for a bulldozer blade to be provided with narrow side plates or cheeks and, in the preferred form of machine in accordance with the invention, the side plates of the shovel attachment provide those cheeks when the attachment is in the inoperative position.

The blade can be designed and mounted without regard to any consideration other than its effectiveness for its primary purpose, viz.: that of pushing loose material in front of it. The shovel attachment can be similarly designed having regard to its function and can be mounted so that the boom provides the reaction abutment when the machine is in use as a shovel. The combination bulldozer-shovel according to the invention can, therefore, be equally efficient in either of its two roles. The shovel attachment can be mounted on simple pivots and requires only a simple pivotal movement to bring it into and out of its operative and inoperative positions.

This movement can be effected by the operator without involving any dismantling or replacement of parts and, therefore, the machine can be switched from one role to another without waste of time. Mechanical means can be provided for swinging the shovel attachment from one position to the other but such means are not essential as the attachment can be so balanced that it can be turned quite easily by hand.

The machine in accordance with the invention can be put to many different uses. It has, however, been designed particularly for handling such materials as loose coal. One of the important problems which it has solved is that of expeditiously trimming ships' cargoes.

In order that the invention may be thoroughly understood an example of a bulldozer in accordance with it will now be described with reference to the accompanying drawings in which:

Fig. 1 is an elevation of the machine.

Fig. 2 is a plan of the machine.

Figs. 3–5 are detail views showing the boom and its blade and shovel in different working positions.

The bulldozer shown in the drawings is of a usual design having a pair of tracks 10 arranged round sprockets 12 driven by an engine 14 housed in the body 16. The body supports a boom 18 which is pivotally mounted at 20 and which can be raised and lowered by means not shown in detail in the drawings but comprising a pump 21 which is controlled through a valve 22 having a control lever 24 situated within reach of the operator who sits on the seat 26.

At its front end, the boom 18 has fixed to it a frame 28 which carries the blade 30.

The above-mentioned arrangement of parts is common to all normal bulldozers. The blade 30 serves to push loose material before the machine and can be brought into the most appropriate position by altering the inclination of the boom.

In order that the machine may be used for picking up material as well as pushing material before it, a shovel attachment 32 is provided. This attachment has a base plate 34 and a pair of side plates 36 but no back plate. The side plates 36 are mounted on pivots 38 projecting inwards from a pair of brackets 40 on the frame 28. The shovel attachment 32 has two positions viz.: an inoperative position shown in Fig. 4 and an operative position shown in Fig. 3.

In the inoperative position, the shovel attachment lies on top of the boom 18 and allows the blade 30 to be used for "dozing" in the ordinary way. It is completely out of the way and does not interfere at all with the normal use of the blade. It is not unusual for bulldozer blades to be provided with side cheeks which prevent the material which is being pushed along from escaping round the ends of the blade. The side plates 36 of the shovel attachment serve to form such side cheeks when the attachment is in its inoperative position as shown in Fig. 4.

In its operative position, the shovel attachment is swung down in front of the blade as shown in Figs. 1 and 3. It is retained in that position by the abutment of a pair of stops 42 on it against a pair of stops 44 on the frame 28. It forms a shovel together with the blade 30 which closes the space between the base plate 34 and the side plates 36. In order to ensure that this space will be properly closed, the blade is provided along its lower edge with an adjustable part 46.

In order that the contents of the shovel may be dumped, the stops 44 are mounted so that they can be moved out of the way of the stops 42. As can be seen from Figs. 1 and 2, each of the stops 44 is pivotally connected to one arm of a bell crank 48 mounted on the frame 28. The bell cranks 48 are connected to two further bell cranks 50 in the frame 28 by rods 52 and the bell cranks 50 are connected to springs 54 which tend to keep the stops 44 in the position shown in Fig. 2. In order to turn the bell cranks against the action of the springs 54 and retract the stops 44, a pedal bar 56 is provided which connects the upper ends of two pivotally mounted arms 58 which are connected to the bellcranks 50 by links 60.

Fig. 3 shows the machine prepared for use as a power shovel. In order to pick up a load such, for example, as loose coal, the machine is advanced so that the shovel slides on the ground beneath the pile of coal. When the shovel has received its load, the boom 18 is raised by the operator by setting the lever 24. The load can then be transported to any desired place. In order to dump the load, the operator depresses the pedal 56 so that the stops 44 are withdrawn, whereupon, the front end of the shovel is lowered under the weight of the load as shown in Fig. 5.

When the load has been dumped and the shovel is to be re-set in the position shown in Fig. 3, it is necessary only to release the pedal 56 and lower the boom. When the shovel touches the ground, it will be swung on its pivots 38 and its stops 42 will force the stops 44 backwards against the action of the springs 54, the stop being provided with rounded noses as shown at 62. The stops 42 then engage below the stops 44 and the shovel is again ready for use.

When the machine is to be used for bulldozing, that is to say, pushing the material before it, the shovel attachment is moved out of the way by being swung on its pivots 38 back into the position shown in Fig. 4. This movement of the shovel can be effected quite easily by hand if, as is shown in the drawings, the shovel is reasonably balanced about the axis of its pivots. Alternatively, a simple arrangement of a cable passing over one or more pulleys near the driver's seat can be arranged to enable the driver to effect the reversal without leaving his seat.

It will be appreciated that the provision of the shovel attachment does not involve any very major alteration of the normal bulldozer. The weight on the front end of the boom is, of course, increased by the shovel attachment but that can be compensated by a counterweight 64 on the rear end of the boom.

It will also be appreciated that the provision of the shovel does not adversely affect the efficiency of the bulldozer when the latter is used in its primary role of pushing material before it. Furthermore, the shovelling efficiency is not adversely affected by the presence of the blade which together with the boom provides a positive reaction abutment for the shovel.

I claim:

1. In combination with a bulldozer having a boom supporting a fixed material pusher blade; a shovel attachment comprising a base plate fixed between spaced side plates near their outer ends, said side plates embracing the pusher blade, and pivots connecting the side plates near their inner ends with the blade, the distance between the axis of the pivots and the upper edge of the blade being less than the distance between said axis and the inner edge of the base plate whereby the shovel attachment may be swung from inoperative position in which the base plate rests upon the top of the boom in rear of the blade, into operative position in which the base plate underlies the blade extending in advance thereof, said blade forming the reaction abutment of the shovel attachment when in operative position.

2. In a combination as set forth in claim 1, said side plates forming checks at the ends of the blade when the shovel attachment is swung into inoperative position.

3. In combination with a bulldozer having a boom supporting a fixed material pusher blade; a shovel attachment comprising a base plate fixed between spaced side plates near their outer ends, said side plates embracing the pusher blade, pivots connecting the side plates near their inner ends with the blade, the distance between the axis of the pivots and the upper edge of the blade being less than the distance between said axis and the inner edge of the base plate whereby the shovel attachment may be swung from inoperative position in which the base plate rests upon the top of the boom in rear of the blade, into operative position in which the base plate underlies the blade, same extending in advance thereof and substantially parallel with the said boom, said blade forming the reaction abutment of the shovel attachment, and releasable means for yieldably retaining the shovel attachment in said operative position.

4. In a combination as set forth in claim 3, said side plates forming checks at the ends of the blade when the shovel attachment is swung into inoperative position.

5. In a combination as set forth in claim 3, said retaining means comprising fixed stops carried by the shovel attachment adapted to normally underlie releasable stops carried by the blade.

6. In combination with a bulldozer having a boom supporting a frame carrying a fixed material pusher blade; a shovel attachment comprising a base plate fixed between spaced side plates near their outer ends, said side plates embracing the pusher blade, pivots connecting the side plates near their inner ends with the frame, the distance between the axis of the pivots and the upper edge of the blade being less than the distance between said axis and the inner edge of the base plate whereby the shovel attachment may be swung from inoperative position in which the base plate rests upon the top of the boom in rear of the blade, into operative position in which the base plate underlies the blade, same extending in advance thereof and substantially parallel with the said boom, said blade forming the reaction abutment of the shovel attachment, means for retaining the shovel attachment in said operative position, and means for releasing said retaining means whereby the weight of the material on the base plate will pivot the base plate downwardly.

7. In a combination as set forth in claim 6, said side plates forming checks at the ends of the blade when the shovel attachment is swung into inoperative position.

8. In combination as set forth in claim 6, said retaining means comprising fixed stops carried by the shovel attachment adapted to normally underlie releasable stops carried by the frame.

9. In a combination as set forth in claim 6, said retaining means comprising fixed stops carried by the side plates adapted to normally underlie retractible stops carried by the frame; and said releasing means comprising a lever pivoted on said frame, and means controlled by said lever adapted to operate said retractible stops.

10. In combination with a bulldozer having a vertically pivotal boom supporting a fixed material pusher blade; a shovel attachment comprising a base plate fixed between spaced side plates near their outer ends, said side plates embracing the pusher blade, pivots connecting the side plates near their inner ends with the frame, the distance between the axis of the pivots and the upper edge of the blade being less than the distance between said axis and the inner edge of the base plate whereby the shovel attachment may be swung from inoperative position in which the base plate rests upon the top of the boom in rear of the blade, and into operative position in which the base plate underlies the blade extending in advance thereof and substantially parallel with the said boom, said blade then forming the reaction abutment of the shovel attachment, means for yieldably retaining the shovel attachment in said operative position when the boom is lowered to bring the base plate into contact with the ground, and means for releasing said retaining means when the boom is raised, whereby the weight of the material on the base plate will pivot the base plate downwardly to discharge the material in the shovel attachment.

11. In a combination as set forth in claim 10, said side plates forming checks at the ends of the blade when the shovel attachment is swung into inoperative position.

12. In a combination as set forth in claim 10, said retaining means comprising fixed stops carried by the side plates adapted to normally underlie retractible stops carried by the frame.

13. In a combination as set forth in claim 10, said retaining means comprising fixed stops carried by the side plates adapted to normally underlie retractible stops carried by the frame; and said releasing means comprising a lever pivoted on said frame, and means controlled by said lever and connected with said retractible stops.

GUY TAITE SHOOSMITH.

REFERENCES CITED

The following references are of record in the file of this patent:

UNITED STATES PATENTS

| Number | Name | Date |
| --- | --- | --- |
| 2,227,624 | Benbow et al. | Jan. 7, 1941 |
| 2,249,356 | Goodman | July 15, 1941 |
| 2,309,223 | Starring | Jan. 26, 1943 |
| 2,313,534 | Gledhill | Mar. 9, 1943 |
| 2,332,561 | Drott | Oct. 26, 1943 |
| 2,483,033 | Baker | Sept. 27, 1949 |
| 2,515,384 | Von Carnop | July 18, 1950 |
| 2,529,208 | Andersen | Nov. 7, 1950 |